Jan. 3, 1967 R. L. SELS 3,296,419

HEAT CONTROL CIRCUIT GENERATING PULSES SYNCHRONIZED TO A.C. SOURCE EMPLOYING TWO PNPN DIODES HAVING DIFFERENT THRESHOLD VALUES

Filed May 6, 1964 3 Sheets-Sheet 1

INVENTOR
R.L. SELS
By M. Pfeffer
ATTORNEY

Jan. 3, 1967 R. L. SELS 3,296,419

HEAT CONTROL CIRCUIT GENERATING PULSES SYNCHRONIZED TO A.C. SOURCE EMPLOYING TWO PNPN DIODES HAVING DIFFERENT THRESHOLD VALUES

Filed May 6, 1964 3 Sheets-Sheet 3

United States Patent Office 3,296,419
Patented Jan. 3, 1967

3,296,419

HEAT CONTROL CIRCUIT GENERATING PULSES SYNCHRONIZED TO A.C. SOURCE EMPLOYING TWO PNPN DIODES HAVING DIFFERENT THRESHOLD VALUES

Robert L. Sels, Temple, Pa., assignor to Western Electric Company, Incorporated, New York, N.Y., a corporation of New York Filed May 6, 1964, Ser. No. 365,531
5 Claims. (Cl. 219—499)

This invention relates to pulse generating circuits.

More specifically, this invention is directed to a circuit for generating pulses synchronized with an A.C. signal. Such a circuit finds particular usefulness in the field of electronic control where it is desired to apply both pulses and an A.C. signal to a control device, such as a silicon controlled rectifier, with the pulses being in a timed relationship with the A.C. signal. It also, when employed with a device such as a silicon controlled rectifier, is especially suited for use in generating pulses of variable frequency and width.

It is, therefore, an object of this invention to provide new and improved pulse generating circuits.

It is another object of this invention to provide new and improved circuits for generating pulses synchronized with an A.C. signal.

It is still another object of this invention to provide new and improved circuits for generating pulses of variable frequency and width.

A pulse generating circuit illustrating certain features of the invention may include first and second capacitors. First and second thyratron-type switching devices, such as PNPN diodes, are connected respectively to the first and second capacitors in a manner such that the first capacitor and the first switching device are essentially in parallel, and the second capacitor and the second switching device are esesntially in parallel. First charging means are provided for applying a rectified A.C. signal to the first capacitor to charge this capacitor to a voltage which is of sufficient magnitude to turn "ON" the second switching device, but insufficient in magnitude to turn "ON" the first switching device. Second charging means including the first capacitor are provided for charging the second capacitor to a voltage sufficient in magnitude to turn "ON" the second switching device. When the second switching device turns "ON," it discharges the second capacitor to generate a first pulse, the magnitude of which is sufficient to turn "ON" the first switching device. Means are provided for applying the first pulse to the first switching device to turn "ON" this device and discharge the first capacitor to generate a second pulse.

In one aspect of the invention, the time during the cycle at which the pulses occur is controlled by the charging rate of the second capacitor, the charging rate being varied to vary the time of occurrence of the pulses. In another aspect of the invention, the charging rate of the second capacitor is maintained constant and the time of occurrence of the pulses is controlled by varying the initial charge on the second capacitor.

The invention will be more fully understood from the detailed description which follows when read in conjunction with the appended drawings, in which.

Figure 3:
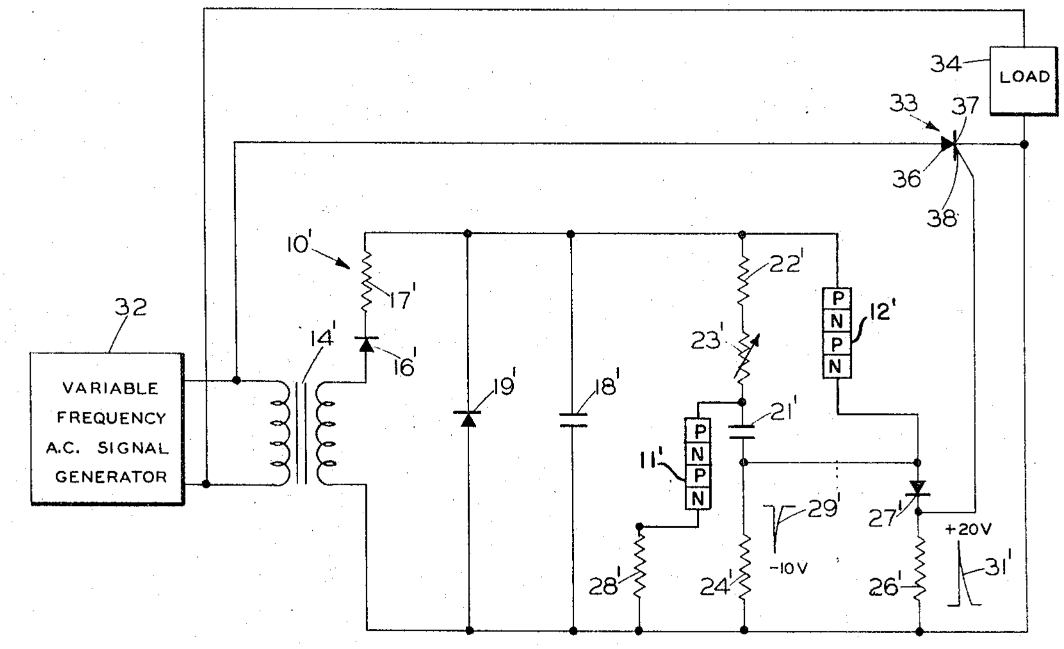
FIG. 3 illustrates an embodiment of the invention employed to generate pulses of variable width and frequency.
Figure 4A:
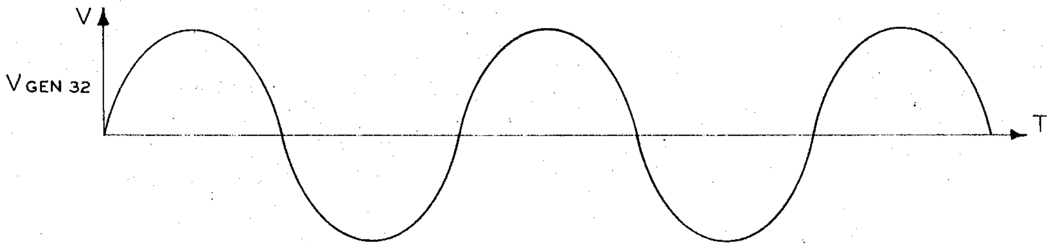
Figure 4B:
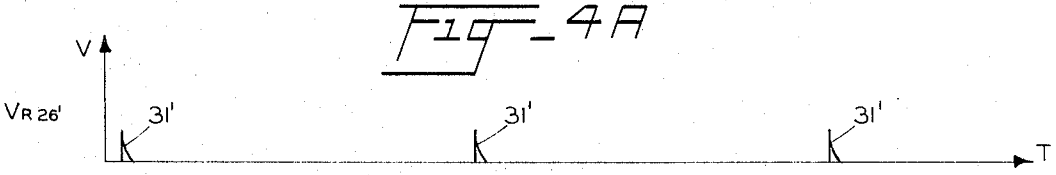
Figure 4C:
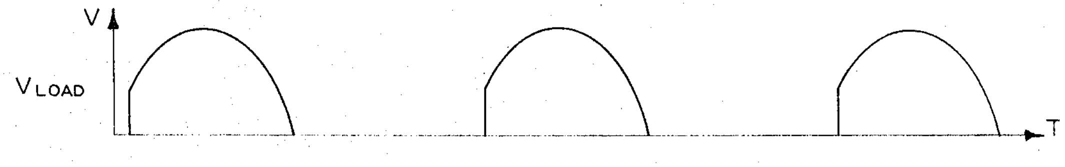
Figure 4D:
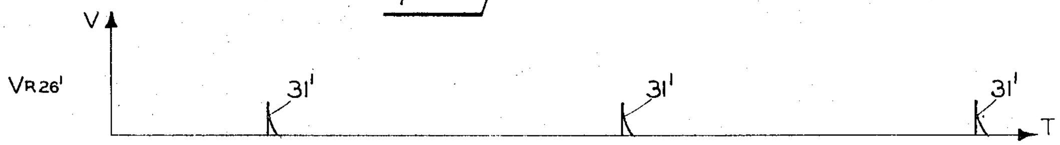
Figure 4E:
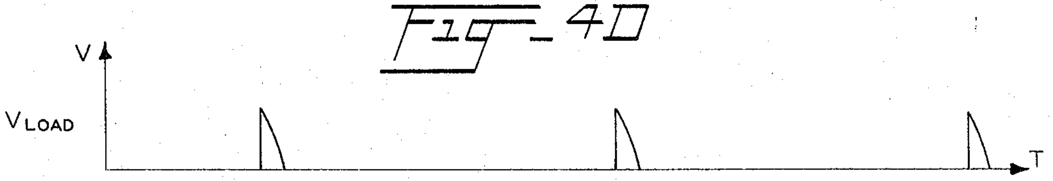
Figure 5:
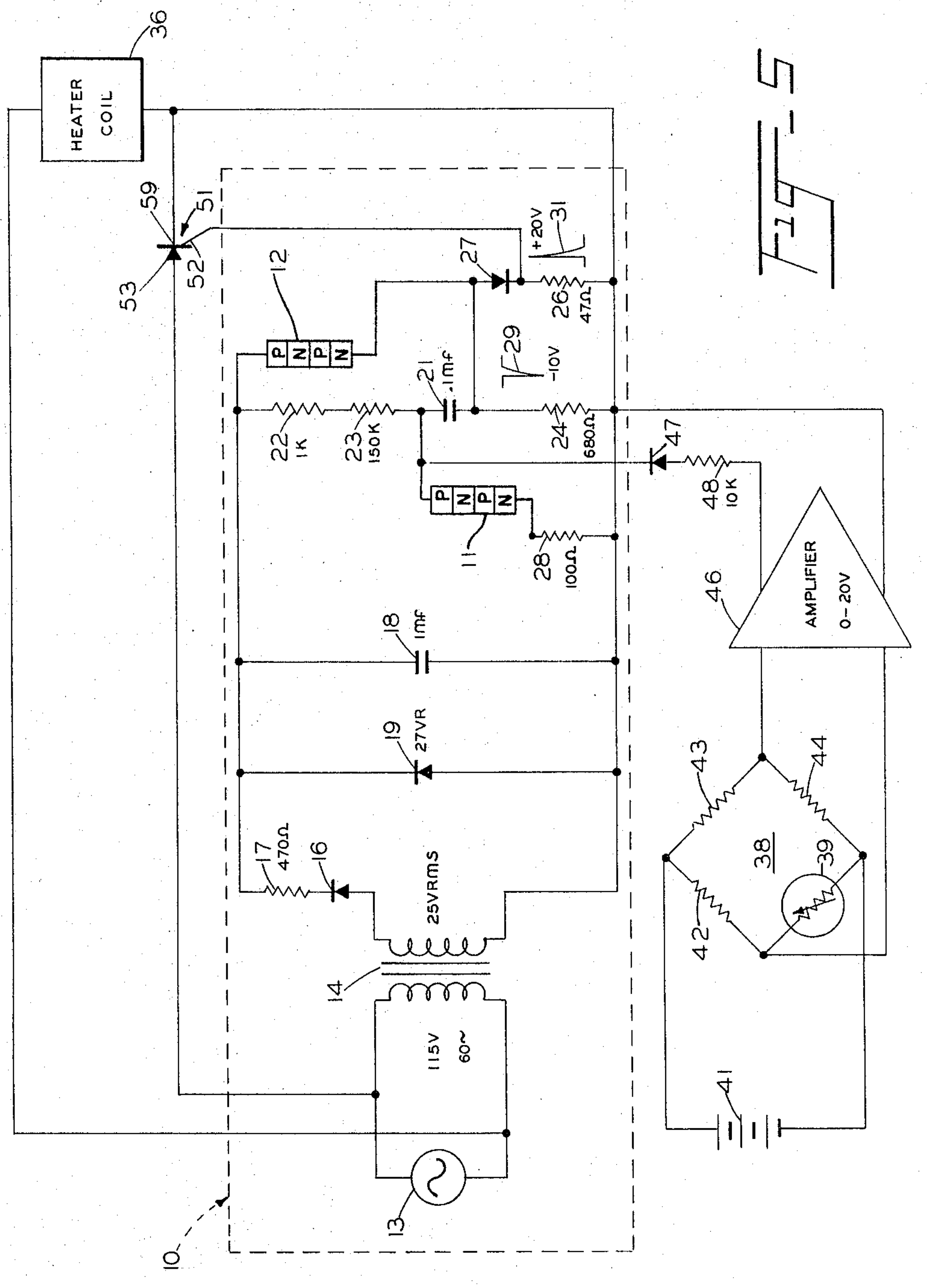

FIG. 4A illustrates graphically an A.C. signal employed in the embodiment of FIG. 3; FIGS. 4B and 4C illustrate graphically voltage wave forms occurring in the embodiment of FIG. 3 for a first operating condition thereof; and FIGS. 4D and 4E illustrate graphically voltage wave forms occurring in the embodiment of FIG. 3 for a second operating condition thereof; and FIG. 5 illustrates an embodiment of the invention employed in an automatic heat control system.

Figure 1:
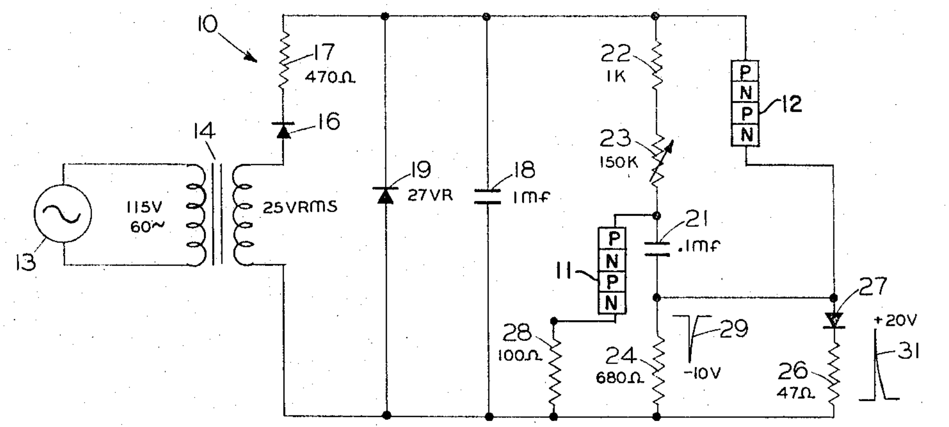
FIG. 1 illustrates schematically an embodiment of the invention employed for generating pulses in a timed relationship with an A.C. signal.

Referring now to the drawings, and particularly to FIG. 1, there is shown a circuit 10 for generating pulses synchronized with an A.C. signal. The circuit 10 employs two thyratron-type switching devices, such as PNPN diodes 11 and 12. These devices are four layer diodes having the characteristics depicted in FIG. 2.

Figure 2:
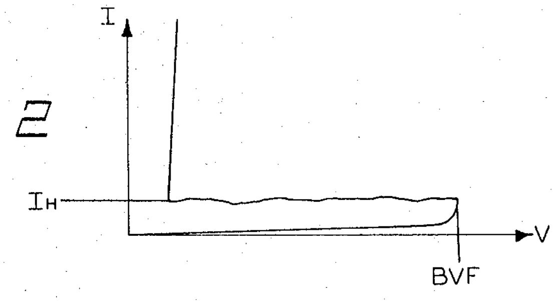
FIG. 2 illustrates graphically the operating characteristics of a thyratron-type switching device, such as a PNPN diode.

As seen in FIG. 2, a PNPN diode remains in its "OFF" state (i.e., its current "blocking" state) until the forward voltage thereacross reaches a value $BV_F$, at which time the diode turns "ON" and acts as a conventional forward biased diode. The voltage $BV_F$ is defined as the forward breakover voltage of the diode. The diode remains "ON" until the current therethrough drops below a "holding current," $I_H$. Advantageously in the circuit 10, the PNPN diode 11 is a Western Electric 1N3300 having a 16–20 volt forward breakover voltage, and the PNPN diode 12 is a Western Electric 1N3303 having a forward breakover voltage of 30–36 volts.

Referring again to FIG. 1, the circuit 10 is seen to include an A.C. source 13, which in the instant embodiment is conventional "house" power, 115 volts, 60 cycles. The output voltage of the source 13 is stepped down to a value suitable for operation of the PNPN diodes 11 and 12 by a step-down transformer 14. The stepped-down voltage, in turn, is rectified by a rectifier diode 16 having a current limiting resistor 17 connected in series therewith, and the rectified voltage employed to charge a capacitor 18 having a voltage regulating diode 19 connected thereacross. The operating voltage of the diode 19 should be greater than the forward breakover voltage of the diode 11 but less than that of the diode 12. Preferably, the capacitor 18 charges to the operating voltage of the diode 19 shortly after initiation of an A.C. cycle. In the instant embodiment, with the circuit values indicated in FIG. 1, the capacitor 18 attains this voltage approximately 30 electrical degrees after initiation of the cycle.

The voltage of the capacitor 18 is impressed across the diode 12 but has no effect thereon at this time, since it is less than the forward breakover voltage of the diode. It does, of course, condition or bias the diode 12 for conduction, as will be seen below.

The voltage of the capacitor 18 is also employed to charge a capacitor 21 through a fixed resistor 22, a variable resistor 23, and the parallel combination of resistors 24 and 26 and a rectifier diode 27. The voltage developed across the capacitor 21 is essentially a ramp, the slope of which is a function of the component values of the charging circuit. In the instant embodiment, the charging circuit can be considered as only including the resistors 22 and 23 and the capacitor 21, since the parallel combination of resistors 24 and 26 is very small compared to the values of resistors 22 and 23.

The capacitor 21 charges until the voltage thereof is substantially equal to the forward breakover voltage of the diode 11. When the capacitor 21 reaches this voltage, the diode 11 turns "ON" discharging the capacitor 21 through the diode 11, the resistor 24 and a current limiting resistor 28. As a result, a negative pulse 29 is developed across the resistor 24. The pulse 29, in turn, is applied to the cathode of the diode 12. The magnitude of the pulse 29 is such that it causes the forward voltage across the diode 12 to exceed the forward breakover voltage thereof. Accordingly, the diode 12 turns "ON" and discharges the capacitor 18 through the diode 12, the diode 27 and the resistor 26, the discharge of the capacitor 18 through the resistor 26 resulting in a positive pulse 31 thereacross. It should be noted that the rectifier diode 27 precludes the negative pulse 29 from appearing across resistor 26. Prior to completion of the cycle, diodes 11 and 12 revert to their current "blocking" state, thereby resetting the circuit for a succeeding cycle of operation.

As is readily seen from the foregoing, the time during the A.C. cycle at which the pulses 29 and 31 are generated depends upon the setting of the variable resistor 23. In the instant embodiment, for a minimum setting of the variable resistor 23, the pulses 29 and 31 will occur substantially 30 electrical degrees after initiation of the cycle and, for a maximum setting, will occur substantially at the end of the cycle, i.e., 360 electrical degrees after start of the cycle. If desired, the occurrence of the pulse at any point from 30 to 360 electrical degrees after cycle initiation can be changed to any point from 210 through 0 to 180 electrical degrees by merely transposing the connections of the primary or secondary winding of the transformer 14.

Referring now to FIG. 3, there is shown an embodiment of the invention employed to generate pulses of variable width and variable frequency. The heart of this embodiment is the circuit 10 of FIG. 1 modified to include a variable frequency A.C. signal generator 32 and component values (not shown) compatible with the frequency over which it is desired to operate. Accordingly, those components in this embodiment performing the same function as those in the circuit 10 of FIG. 1 will be designated by primed reference numerals.

The output of the variable frequency A.C. signal generator 32, like the fixed frequency source 13 of the previous embodiment, is coupled to a transformer 14'. Additionally, it forms an element of a series circuit which includes a thyratron-type switching device, such as a silicon controlled rectifier 33 and a load element 34. Silicon controlled rectifiers are three terminal, four layer semiconductor devices having characteristics substantially similar to PNPN diodes. They can be turned "ON" either by applying a predetermined voltage across the device from an anode 36 to a cathode 37, or by applying a predetermined voltage to a gate element 38. Like PNPN diodes, once turned "ON," silicon controlled rectifiers stay "ON" until the current therethrough falls below a predetermined holding current.

In the embodiment of FIG. 3, the gate element 38 of the silicon controlled rectifier 33 is connected to one end of a resistor 26', and the cathode 37 is connected to the other end of the resistor 26'. As in the previous embodiment, a positive pulse 31' is developed at the resistor 26' during each A.C. cycle. The component values in this embodiment are selected such that the magnitude of the pulse 31' is sufficient to turn "ON" the silicon controlled rectifier 33 at substantially any point during a positive half-cycle of the generator 32. Accordingly, when the pulse 31' appears at the resistor 26' during a positive half-cycle, the silicon controlled rectifier 33 turns "ON" to pass the output signal of the source 32 to the load 34. The signal supplied to the load 34 is a pulse, the width of which depends on the time during a positive half-cycle at which the pulse 31' is generated. This will be more readily understood by referring to FIGS. 4A through 4E.

Referring first to FIG. 4A, there is shown graphically the output voltage of the generator 32. FIG. 4B depicts graphically the occurrence of the pulse 31' for a first setting of the variable resistor 23'. This first setting has been selected such that the pulse 31' occurs shortly after the initiation of each positive half-cycle. As pointed out above, occurrence of the pulse 31' results in a turning "ON" of the silicon controlled rectifier 33, this device remaining on until the current therethrough falls below a predetermined holding current. Advantageously, the holding current of the silicon controlled rectifier 33 is not reached until the output voltage of the generator 32 is approximately equal to zero. Accordingly, as seen in FIG. 4C, the voltage across the load 34 is a pulse having a duration approximately equal to the duration of a positive half-cycle of the ouput of generator 32.

Referring now to FIG. 4D, there is illustrated the occurrence of the pulse 31' for a second setting of the variable resistor 23', which setting has been chosen such that the pulse 31' occurs near the end of a positive half-cycle of operation. Thus, as seen in FIG. 4E, a relatively short duration pulse appears across the load. Settings of the variable resistor 23' in-between the first and second settings reflected in FIGS. 4B and 4D, respectively, will, of course, provide pulses longer than those of FIG. 4C and shorter than those of FIG. 4E. The frequency of the pulses delivered to the load 34 can be varied by varying the frequency of the generator 32. If desired, the wave shape of the pulses can be modified by interposing suitable, conventional wave shaping circuitry between the silicon controlled rectifier 33 and the load 34.

As mentioned above, the time during the cycle at which the diodes 11 and 12 (or 11' and 12') turn "ON" can be varied by changing the setting of the variable resistor 23 (or 23') to vary the charging rate of the capacitor 21 (or 21'). Alternatively, this time can be varied by maintaining the charging rate at a fixed value and varying the initial charge of the capacitor 21 (or 21'). As will be seen shortly, this latter mode of operation finds extreme usefulness in automatic control systems.

Turning now to FIG. 5, there is shown an automatic heat control system employing the circuit of FIG. 1 and including a conventional heating device, such as a heating coil 36 and a conventional temperature sensing arrangement, such as a Wheatstone bridge 38 having a thermistor 39 in one of the arms thereof. As is usual, the bridge 38 is energized by a suitable source of D.C. voltage 41, and the other arms of the bridge are provided with respective resistors 42, 43 and 44. The values of the resistors 42, 43 and 44 are selected such that when the temperature of the unit being controlled (not shown) is at a desired value, the bridge 38 provides a relatively low output voltage, and when the temperature of the unit is substantially below the desired value, the bridge provides a relatively high output voltage. The output of the bridge 38, after being amplified by an amplifier 46, is applied to the capacitor 21 through a suitable isolating circuit, such as a rectifier diode 47 in series with a resistor 48.

Like the previous embodiment, this embodiment includes a silicon controlled rectifier 51. The gate element 52 of the silicon controlled rectifier 51 is connected to the resistor 26, and the anode 53 and cathode 59 thereof are connected in a series circuit which includes the output of the supply 13 and the heating coil 36. Additionally, the cathode 59 is connected to the common end of the resistor 26.

Prior to operation, the variable resistor 23 is set for maximum delay, that is, it is set for the slowest charging rate.

Initially, the temperature of the unit under control is substantially below its desired value and, accordingly, a relatively large voltage is developed at the output of the amplifier 46. The magnitude of this voltage is approximately equal to the forward breakover voltage of the diode 11 and causes the capacitor 21 to charge to a voltage slightly less than the forward breakover voltage of the diode. The value of the resistor 48 is such that the capacitor 21 attains this voltage before the capacitor 18 reaches the operating voltage of the voltage regulating diode 19. Accordingly, shortly after the voltage of the capacitor 18 is at this latter value, the capacitor 21 charges to the forward breakover voltage of the diode 11. As before, this results in a pulse 31 the magnitude of which is sufficient to turn "ON" the silicon controlled rectifier 51. Turning "ON" of the silicon controlled rectifier 51, results in a relatively long duration pulse being applied to the heating coil 36. As the temperature of the unit under control approaches its desired value, the output voltage of the bridge 38 decreases, resulting in less and less pre-charging of the capacitor 21 from the amplifier 46. This, in turn, results in greater electrical delay of the pulse 31 and, hence, in shorter "ON" times for the silicon controlled rectifier 48 and the heating coil 36. The foregoing process continues until the unit under control reaches its desired temperature, whereupon the only heat supplied to the unit is that which is necessary to compensate for heat losses.

The term "thyratron-type switching device" as employed in the specification and claims is meant to include devices which, in operation, are triggered into a conduction state, and which stay in this state after removal of the triggering impetus until the voltage across the device or the current therethrough falls below a predetermined value. Examples of such devices are: PNPN diodes; silicon controlled rectifiers; silicon controlled switches, trigistors; transwitches and thyratron gas tubes. The foregoing definition is also meant to include conventional transistors arranged so as to substantially duplicate in operation the characteristics of the devices enumerated hereinabove.

It is to be understood that the above-described embodiments are merely illustrative of the principles of the invention. Other embodiments may be devised by persons skilled in the art which embody these principles and fall within the spirit and scope thereof.

What is claimed is:

1. A circuit for generating pulses in timed relationship with an A.C. signal having a voltage of a given magnitude, which comprises:

a first capacitor;

a first resistor;

a first PNPN diode, having a breakover voltage in excess of said given magnitude, coupled to said first capacitor and said first resistor in a closed loop;

a second capacitor;

a second resistor;

a second PNPN diode, having a breakover voltage lower than said given magnitude, coupled to said second capacitor and said second resistor in a closed loop;

a rectifier;

means for applying said A.C. signal to said rectifier;

means for applying the output of said rectifier to said first capacitor to charge said first capacitor with a voltage of said given magnitude;

means, including a variable resistor and said first capacitor, for charging said second capacitor to said second PNPN diode breakover voltage, whereby said second PNPN diode assumes its low impedance state, said second capacitor discharges through said second resistor generating a first pulse in timed relationship with said A.C. signal and of a magnitude sufficient, when added to said voltage of said given magnitude, to cause said first PNPN diode to assume its low impedance state; and means for applying said first pulse to said first PNPN diode, causing said first PNPN diode to assume its low impedance state, discharging said first capacitor through said first resistor, and generating a second pulse in timed relationship with said A.C. signal; wherein the setting of said variable resistor determines the charging rate of second capacitor and, hence, the timed relationship between said A.C. signal and said first and second pulses.

2. A pulse generating circuit, which comprises:

a rectifier;

means for applying an A.C. signal having a voltage of a given magnitude to said rectifier;

a first capacitor;

a first resistor;

a first PNPN diode, having a breakover voltage in excess of said given magnitude, coupled to said first capacitor and said first resistor in a closed loop;

a second capacitor;

a second resistor;

a second PNPN diode, having a breakover voltage lower than said given magnitude, coupled to said second capacitor and said second resistor in a closed loop;

means for applying the output of said rectifier to said first capacitor to charge said first capacitor with a voltage of said given magnitude;

a silicon controlled rectifier having a first electrode, a second electrode and a control electrode, said first electrode being coupled to one side of said A.C. signal-applying means;

a variable resistor;

means, including said variable resistor and said first capacitor, for charging said second capacitor to said second PNPN diode breakover voltage, whereby said second PNPN diode assumes its low impedance state, said second capacitor discharges, generating a first pulse in timed relationship with said A.C. signal and of a magnitude sufficient, when added to said given magnitude, to cause said first PNPN diode to assume its low impedance state;

means for applying said first pulse to said first PNPN diode, causing said first PNPN diode to assume its low impedance state, discharging said first capacitor through said first resistor, to generate a second pulse in timed relationship with said A.C. signal of a magnitude sufficient to cause said silicon controlled rectifier to switch into its conductive state; and means for applying said second pulse to said silicon controlled rectifier to gate said silicon controlled rectifier thereby causing an output pulse to pass from said A.C. signal applying means through said silicon controlled rectifier to a lead circuit, the width of said output pulse being dependent upon the timed relationship between said A.C. signal and said second pulse, and being determined by the setting of said variable resistor.

3. A circuit as defined in claim 2, in which the frequency of said A.C. signal is variable so as to vary the frequency of said output pulse.

4. An automatic heat control system comprising:

a heating device having a pair of electrical terminals;

a Wheatstone bridge including a first resistor, a second resistor, a third resistor, a thermistor whose resistance varies with temperature, and a source of D.C. voltage coupled across said bridge, wherein the output of said bridge, at a desired temperature value, provides a relatively low output voltage, and wherein the bridge provides a relatively high output voltage when the temperature of said system is substantially below the desired value;

an amplifier coupled to the output of said bridge;

an A.C. source having a pair of output terminals;

a silicon controlled rectifier having a first electrode, a second electrode and a gate electrode;

means coupling one of said A.C. source terminals to one terminal of said heating device;

means coupling the other A.C. source terminal to said first electrode of said silicon controlled rectifier;

means coupling said second electrode to the other terminal of said heating device;

a transformer having a primary winding and a secondary winding;

means coupling said primary winding across said pair of output terminals;

a current limiting resistor;

a rectifier diode having one electrode coupled to one terminal of said secondary winding and the other electrode coupled to said current limiting resistor;

a voltage regulating diode coupled in a closed loop across said secondary winding and said current limiting resistor;

a first capacitor coupled across said voltage regulating diode;

a first PNPN diode, a second rectifier diode, and an output resistor arranged in serial relationship in shunt across said first capacitor;

a fixed resistor, a variable resistor, a second PNPN diode, and a second current limiting resistor arranged in serial relationship in shunt across said first capacitor;

a second capacitor having a first terminal and a second terminal;

a pulse producing resistor having a first terminal and a second terminal;

means coupling said second capacitor first terminal to the common junction of said variable resistor and said second PNPN diode;

means coupling said second capacitor second terminal, and said pulse producing resistor first terminal together to the common junction of said first PNPN diode and said second rectifier diode;

means coupling said pulse producing resistor second terminal to said other terminal of said secondary winding;

an isolating diode having one electrode coupled to the output of said amplifier and the other electrode coupled to the common junction of said variable resistor and said second PNPN diode; and means coupling the common junction of said second rectifier diode and said output resistor to said gate electrode.

5. A circuit for generating pulses in timed relationship with an alternating current source having a voltage of a given magnitude, which comprises:

a first capacitor, a first PNPN diode having a breakover voltage in excess of said given magnitude, and a unilateral impedance means coupled together in a closed loop;

a second capacitor, a second PNPN diode having a breakover voltage lower in magnitude than said given magnitude, and a resistive means coupled together in a closed loop;

means coupling said resistive means to said unilateral impedance means; and variable resistance means coupling said first named loop to said second named loop.

References Cited by the Examiner

UNITED STATES PATENTS

| | | | |
|---|---|---|---|
| 3,188,487 | 6/1965 | Hutson | 307—88.5 |
| 3,188,490 | 6/1965 | Hoff et al. | 307—88.5 |
| 3,189,747 | 6/1965 | Hoff | 307—88.5 |
| 3,204,172 | 8/1965 | Darling et al. | 307—88.5 |
| 3,204,174 | 8/1965 | Clerc | 307—88.5 |
| 3,242,416 | 3/1966 | White | 307—88.5 |

ARTHUR GAUSS, *Primary Examiner.*

J. HEYMAN, *Assistant Examiner.*